US011931755B2

(12) United States Patent
Placencia et al.

(10) Patent No.: US 11,931,755 B2
(45) Date of Patent: Mar. 19, 2024

(54) SPRINKLER SHIELD TECHNOLOGY

(71) Applicants: Hector Placencia, Phoenix, AZ (US); Marcus Mario Moreno, Chandler, AZ (US)

(72) Inventors: Hector Placencia, Phoenix, AZ (US); Marcus Mario Moreno, Chandler, AZ (US)

(*) Notice: Subject to any disclaimer, the term of this patent is extended or adjusted under 35 U.S.C. 154(b) by 34 days.

(21) Appl. No.: 17/300,723

(22) Filed: Oct. 4, 2021

(65) Prior Publication Data

US 2022/0105532 A1 Apr. 7, 2022

Related U.S. Application Data

(60) Provisional application No. 63/087,277, filed on Oct. 4, 2020.

(51) Int. Cl.
*B05B 15/16* (2018.01)

(52) U.S. Cl.
CPC .................................... *B05B 15/16* (2018.02)

(58) Field of Classification Search
CPC ........... B05B 15/16; B05B 1/26; B05B 1/262; B05B 1/265; B05B 1/267; B05B 1/28; B05B 12/32; B05B 12/36; B05B 15/622; B05B 15/74; B05B 3/08; B05B 15/70; B05B 3/085; B65D 45/025; A01G 25/16; A01G 25/00
USPC .... 239/288, 288.3, 275, 276, 280, 281, 201, 239/203
See application file for complete search history.

(56) References Cited

U.S. PATENT DOCUMENTS

| | | | | |
|---|---|---|---|---|
| 2,272,867 A * | 2/1942 | Cobel | B65D 45/025 | 222/473 |
| 2,329,231 A * | 9/1943 | Thomas | B05B 1/267 | 239/511 |
| 6,179,228 B1 * | 1/2001 | Ramaker | B05B 1/265 | 261/120 |
| 6,336,599 B1 * | 1/2002 | Herr | B05B 12/36 | 239/513 |
| 6,702,205 B1 * | 3/2004 | Abercrombie | B05B 1/267 | 239/521 |
| 10,232,389 B1 * | 3/2019 | Forrest | B05B 1/323 | |
| 2017/0080437 A1 * | 3/2017 | Brewer | A01G 25/00 | |

* cited by examiner

*Primary Examiner* — Qingzhang Zhou
*Assistant Examiner* — Juan C Barrera
(74) *Attorney, Agent, or Firm* — Skinner And Associates; Joel Skinner

(57) ABSTRACT

A tool including a deflector, a rod comprising a first end and a second end, and a spring configured to pivot the deflector from a first position to a second position when compressed. In many embodiments, the rod can be coupled to the deflector at the first end. Other embodiments of related apparatuses are also provided.

13 Claims, 17 Drawing Sheets

SPRINKLER SHIELD TECHNOLOGY

CROSS-REFERENCE TO RELATED APPLICATIONS, IF ANY

This application claims the benefit under 35 U.S.C. § 119(e) of U.S. Provisional Patent Application Ser. No. 63/087,277, filed Oct. 4, 2020, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field

The present invention relates, generally, to tools. More particularly, the invention relates to tools for sprinklers. Most particularly, the invention relates to a system, apparatus and method for shielding direct water from sprinklers.

2. Background Information

Existing technology, in general, includes apparatus and/or methods for sprinkling or otherwise applying water to lawns, gardens, fields and the like.

This technology is believed to have significant limitations and shortcomings.

For these and other reasons, a need exists for the present invention.

All US patents and patent applications, and all other published documents mentioned anywhere in this application are hereby incorporated by reference in their entirety.

BRIEF SUMMARY

The present invention provides a sprinkling apparatus and method which is practical, reliable, accurate and efficient, and which is believed to fulfill a need and to constitute an improvement over the background technology.

Some embodiments can include a tool for straight or substantially straight shielding. In a number of embodiments, the straight line tool can comprise a deflector, a rod comprising a first end and a second end, and a spring configured to pivot the deflector from a first position to a second position when compressed. In many embodiments, the rod can be coupled to the deflector at the first end.

Some embodiments can include a tool for corner or otherwise angled shielding. In a number of embodiments, the corner tool can comprise a stalk comprising a first stalk end and a second stalk end, and a rod coupled to the stalk at the second stalk end, wherein the rod comprises a first rod end, a second rod end, and a pivot at the first rod end. In some embodiments, the tool further can comprise a stalk spring inserted on the pivot. In many embodiments, the tool further can comprise a first deflector coupled to the second rod end, a second deflector at a first angle from the first deflector and coupled at the second rod end, and a deflector spring configured to separate the first deflector from the second deflector at an angle.

In one aspect, the invention provides a sprinkler shield, comprising:

- at least one deflector;
- a rod comprising a first end and a second end, wherein the rod is coupled to the at least one deflector at the first end; and
- a spring configured to pivot the deflector from a first position to a second position when compressed.

In another aspect, the invention provides a sprinkler shield comprising:

- a stalk comprising a first stalk end and a second stalk end;
- a rod coupled to the stalk at the second stalk end, where the rod comprises a first rod end, a second rod end, and a pivot at the first rod end;
- a stalk spring inserted on the pivot;
- a first deflector coupled to rod;
- a second deflector at a first angle from the first deflector and coupled to the rod; and
- a deflector spring configured to separate the first deflector from the second deflector at an angle.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

Figure (or Fig., FIG., or the like) 1 is a perspective view of a first embodiment of a sprinkler shield of the present invention, which is particularly suitable for use in straight line applications, wherein the sprinkler shield is partially inserted into ground.

DETAILED DESCRIPTION

Figure 1:
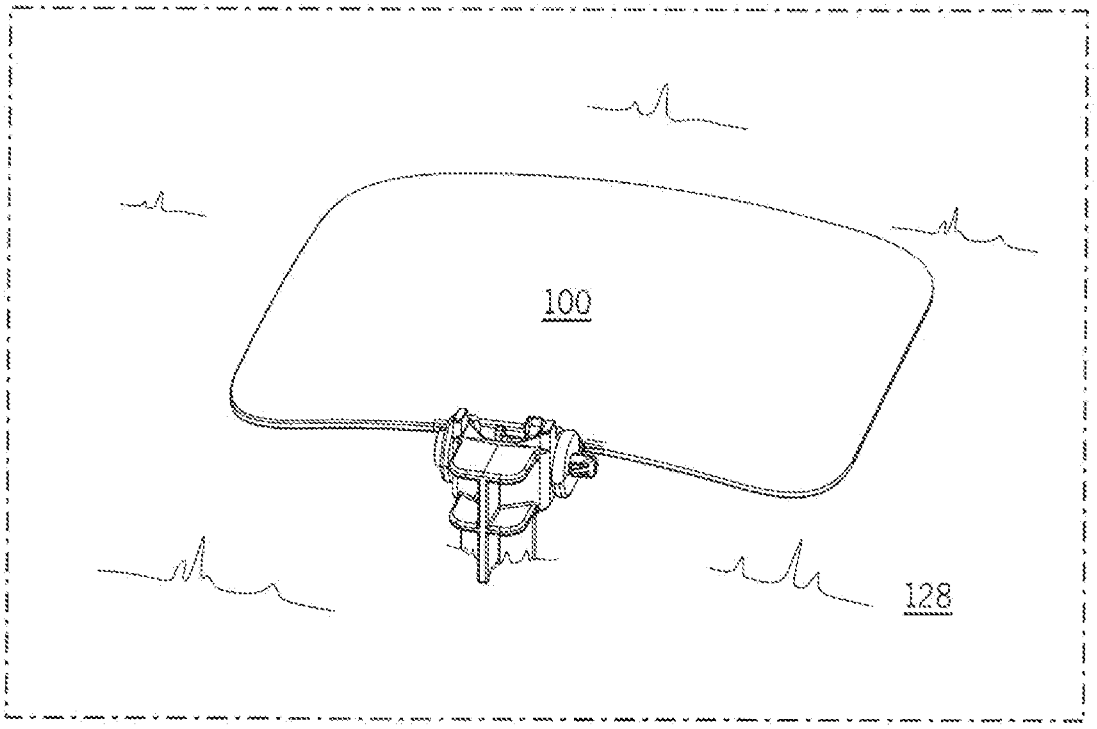

The description that follows describes, illustrates and exemplifies one or more embodiments of the sprinkler shield of the invention. This description is not provided to limit the disclosure to the embodiments described herein, but rather to explain and teach various principles to enable one of ordinary skill in the art to understand these principles and, with that understanding, be able to apply them to practice not only the embodiments described herein, but also other embodiments that may come to mind in accordance with these principles. The scope of the instant disclosure is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers in cases where such labeling facilitates a more clear description. Additionally, the drawings set forth herein are not necessarily drawn to scale, and in some instances, proportions may have been exaggerated to more clearly depict certain features.

A first embodiment of the sprinkler shield 100 of the invention is particularly suitable for straight line applications where the user wishes to shield a straight or substantially straight portion of sidewalk 120, driveway 122, street 124, curb 126 landscaping wall, building or other, feature (horizontal or vertical) that is either impervious to water or for which the user otherwise wishes to shield from spraying 130. The sprinkler shield blocks or shields those features from contact with water sprayed from an associated sprinkler. The sprinkler shield also directs or aids or facilitates in directing water from an associated sprinkler to a lawn, grass 128, garden, plant(s) or other feature that is desired to be watered.

FIGS. 1 to 5 illustrate the exemplary first embodiment of a sprinkler shield 100 as a tool for shielding sprinkler spray 130 from one area and aiding direction of spray to a desirable area 128. The sprinkler shield tool 100 can be placed behind a sprinkler or attached to the sprinkler 132. In a number of embodiments, tool 100 can comprise a deflector 102. Deflector 102 can also be referred to as a shield. In many embodiments, deflector 102 can comprise polypropylene. In many embodiments, deflector 102 can direct or deflect the spray 130 of water from a source 132 (e.g., a sprinkler) to spray or spread to desired areas. In some embodiments, deflector 102 prevents water from spraying in designated areas, such as a fence, a wall, sidewalk, driveway, curb, street, or the like.

Figure 10:
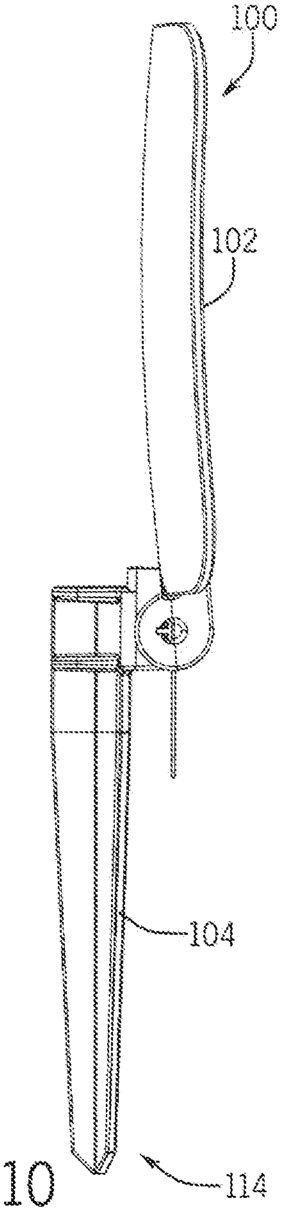
FIG. 10 is a side elevation view of the sprinkler shield of FIG. 9, the opposite side being substantially a mirror image thereof.
Figure 11:
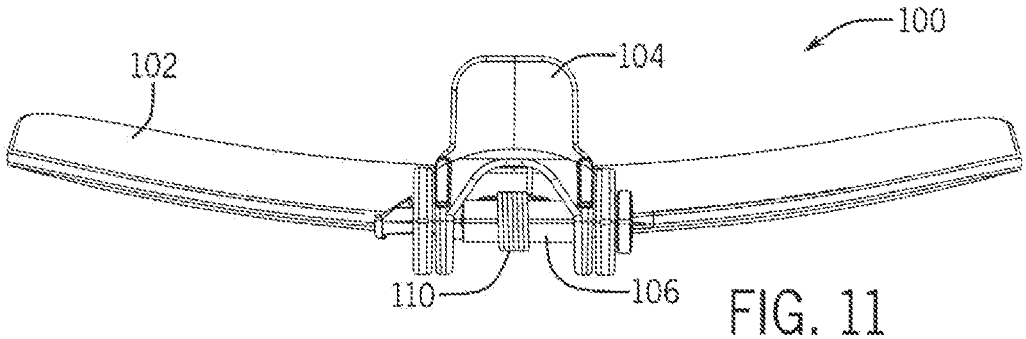
FIG. 11 is a top view of the sprinkler shield.
Figure 12:
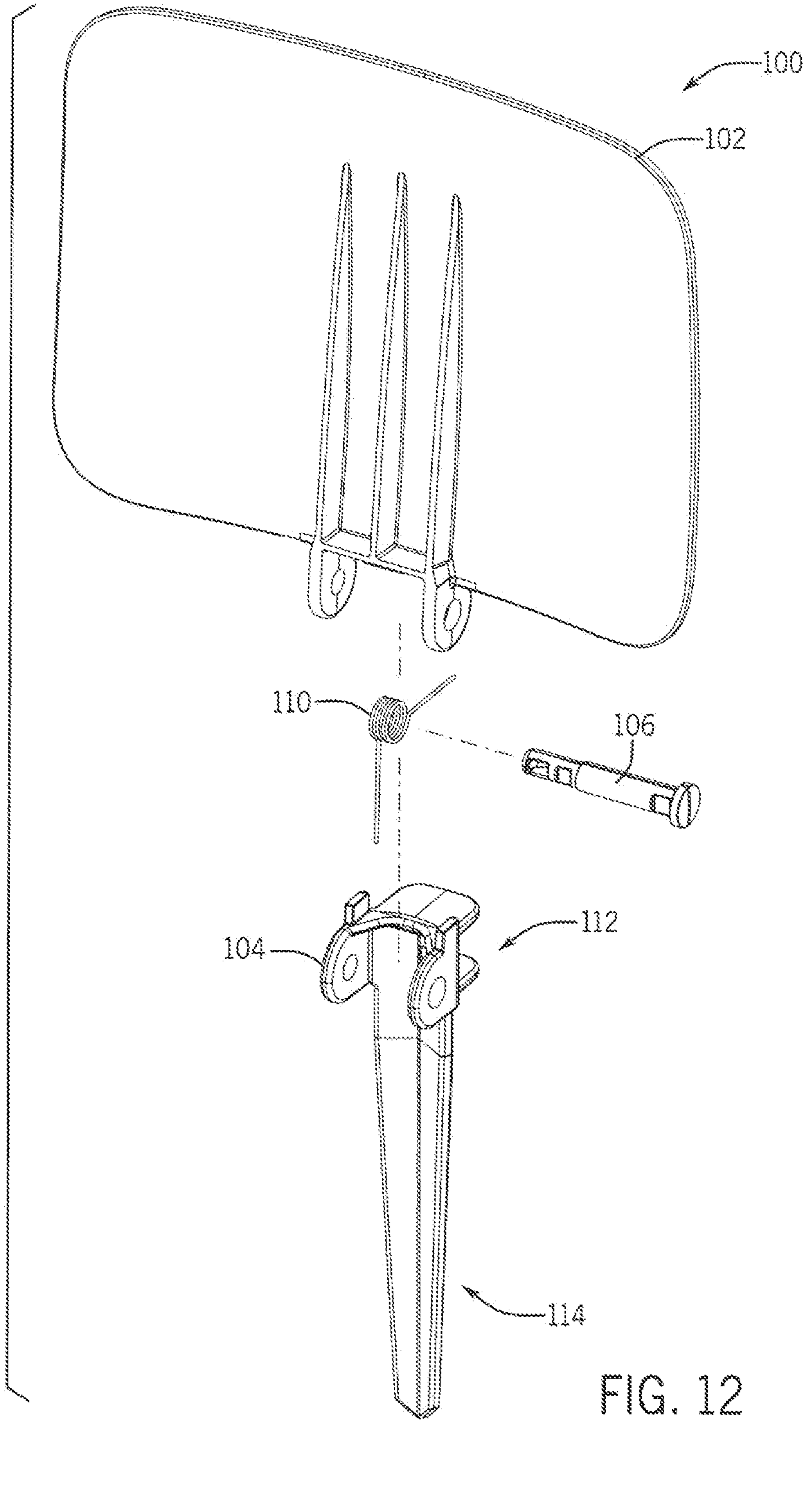
FIG. 12 is an exploded view of the sprinkler shield.
Figure 15:
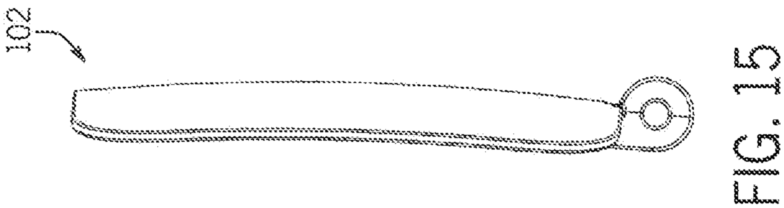
FIG. 15 is a side elevation view of the deflector, the opposite side being substantially a mirror image thereof.
Figure 14:
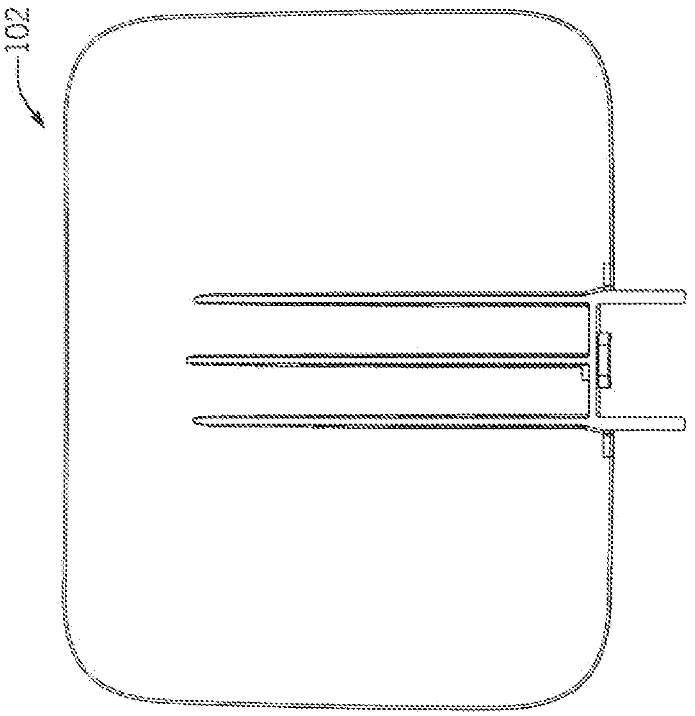
FIG. 14 is a front elevation view of the deflector.
Figure 16:
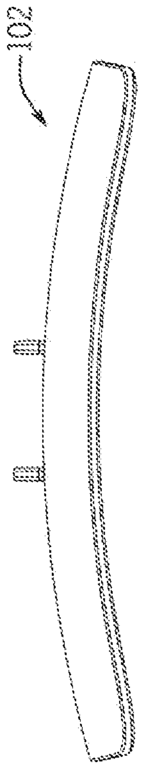
FIG. 16 is a top view of the deflector.
Figure 13:
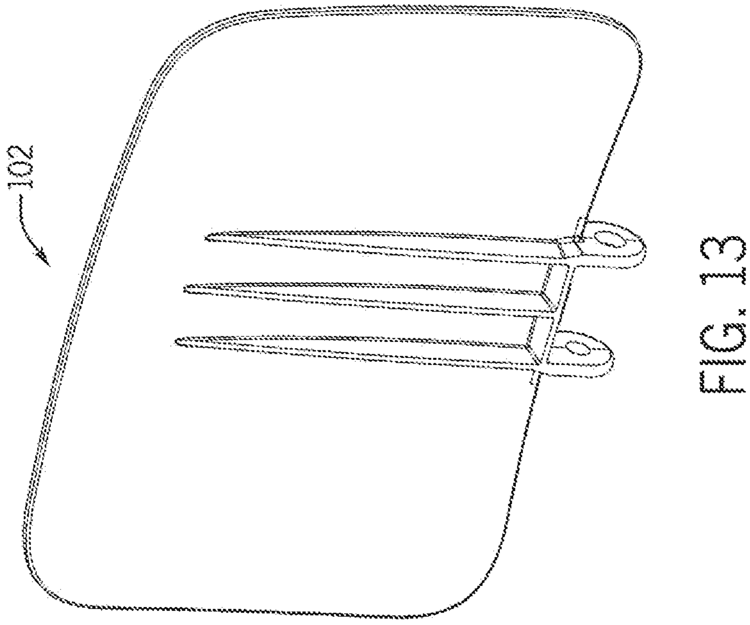
FIG. 13 is a perspective view of an embodiment of a deflector member of the sprinkler shield.
Figure 20:
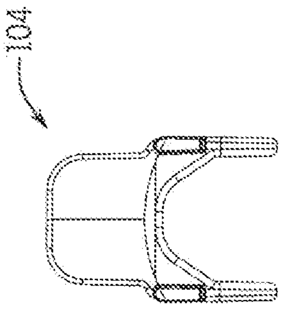
FIG. 20 is a top view of the stalk member.
Figure 19:
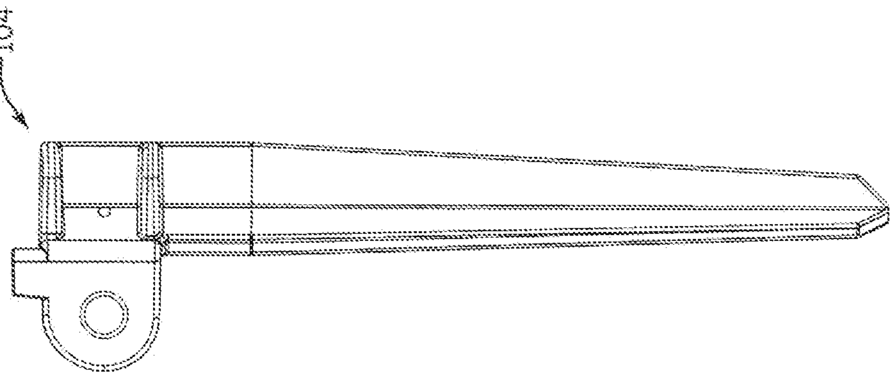
FIG. 19 is a side elevation view of the stalk member, the opposite side being substantially a mirror image thereof.
Figure 18:
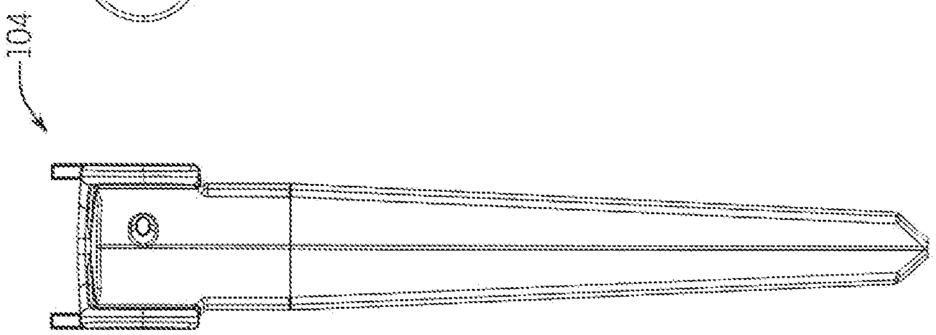
FIG. 18 a front elevation view of the stalk member.
Figure 17:
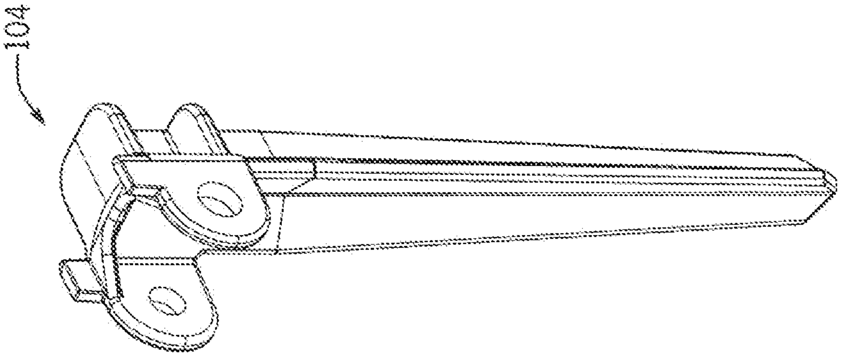
FIG. 17 is a perspective view of an embodiment of a stalk member of the sprinkler shield.
Figure 21:
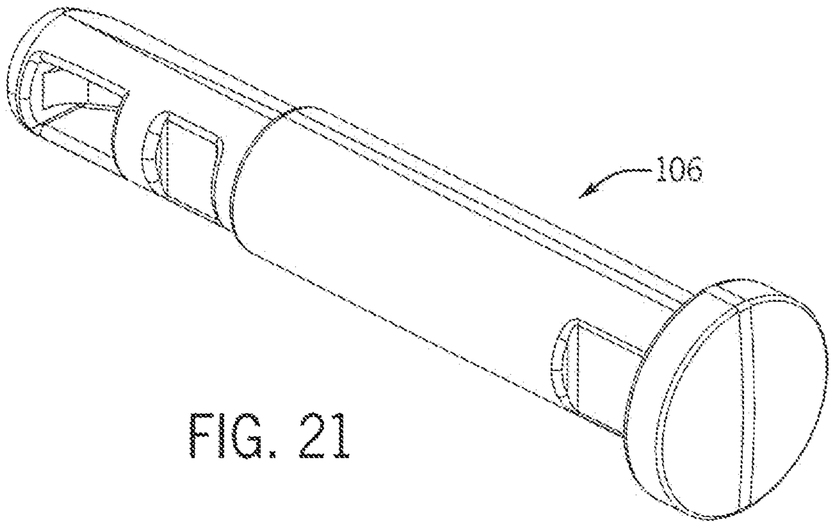
FIG. 21 is a perspective view of an embodiment of a pin member of the sprinkler shield.
Figure 22:
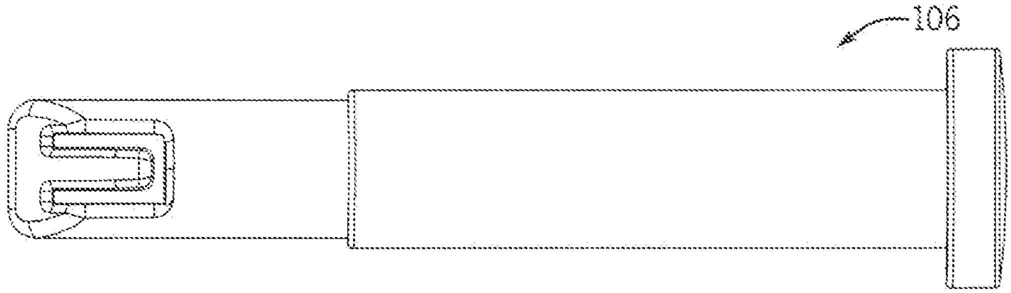
FIG. 22 is a front elevation view of the pin member.
Figure 23:
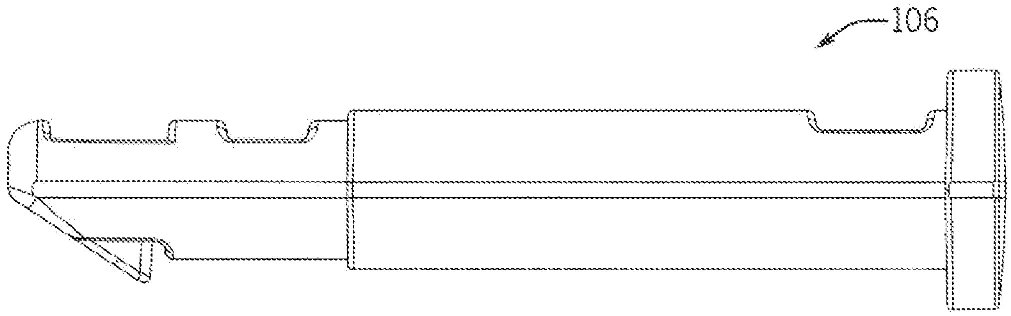
FIG. 23 is a side elevation view of the pin member, the opposite side being substantially a mirror image thereof.
Figure 24:
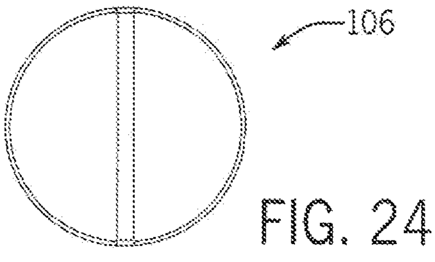
FIG. 24 is a top view of the pin member.
Figure 25:
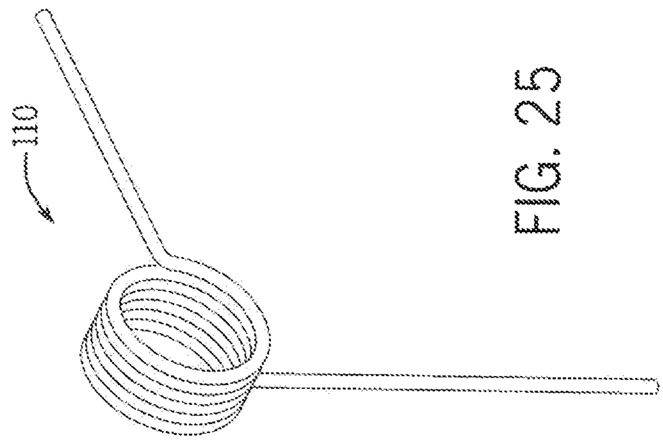
FIG. 25 is a perspective view of an embodiment of a spring member of the sprinkler shield.
Figure 26:
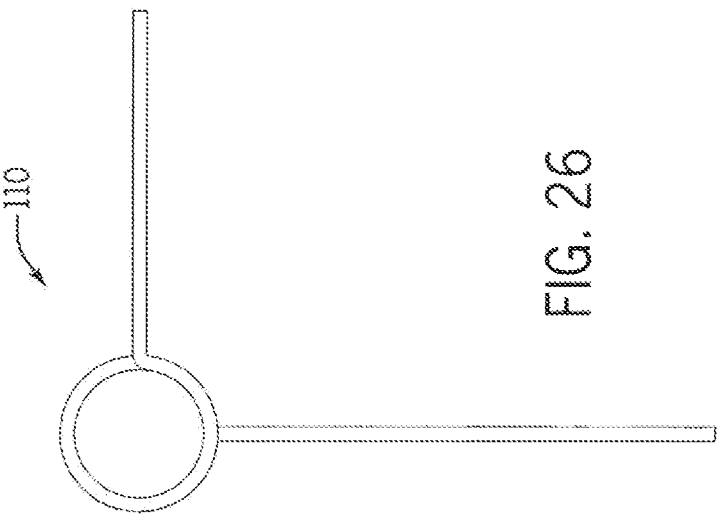
FIG. 26 is a front elevation view of the spring member, the back view being a mirror image thereof.
Figure 27:
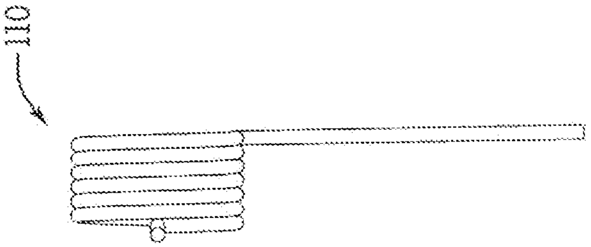
FIG. 27 is a side elevation view of the spring member, the opposite side being substantially a mirror image thereof.
Figure 28:
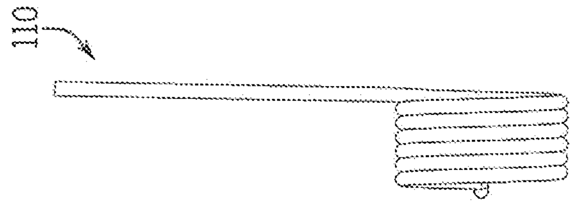
FIG. 28 is a top view of the spring member.
Figure 29:
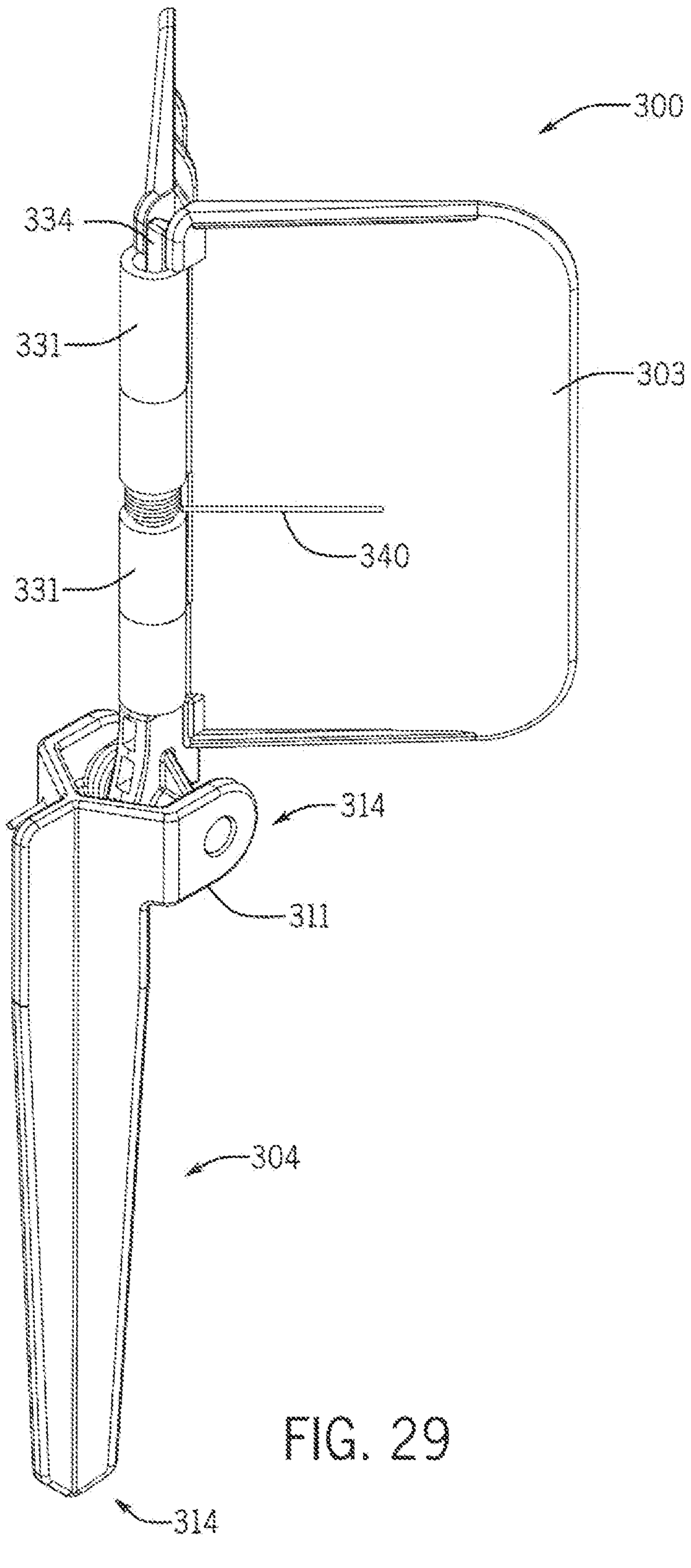
FIG. 29 is a perspective view of the second embodiment of sprinkler shield of FIGS. 6-12 for corner applications, wherein the sprinkler shield is in an actuated state whereby it will extend upwardly and outwardly when its associated in ground sprinkler head deploys upwardly.
Figure 33:
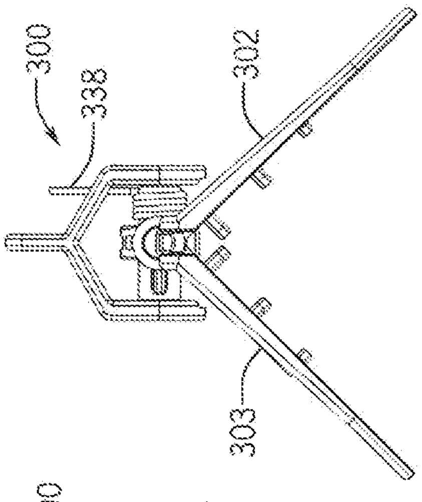
FIG. 33 is a top view of the sprinkler shield.
Figure 32:
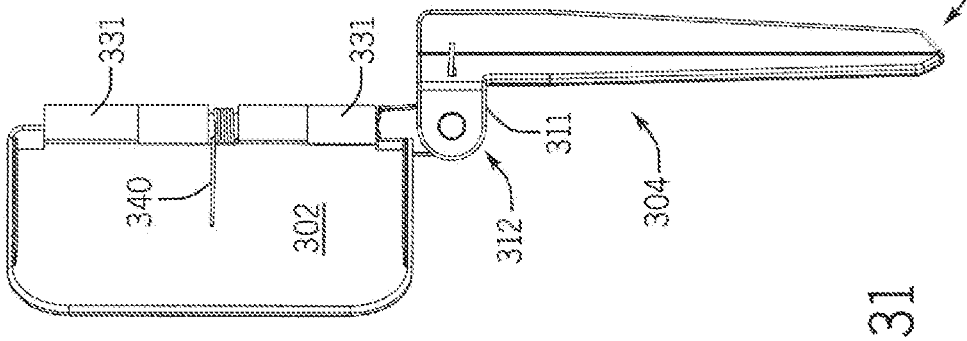
FIG. 32 is a side elevation view of the sprinkler shield, the opposite side being substantially a mirror image thereof.
Figure 31:
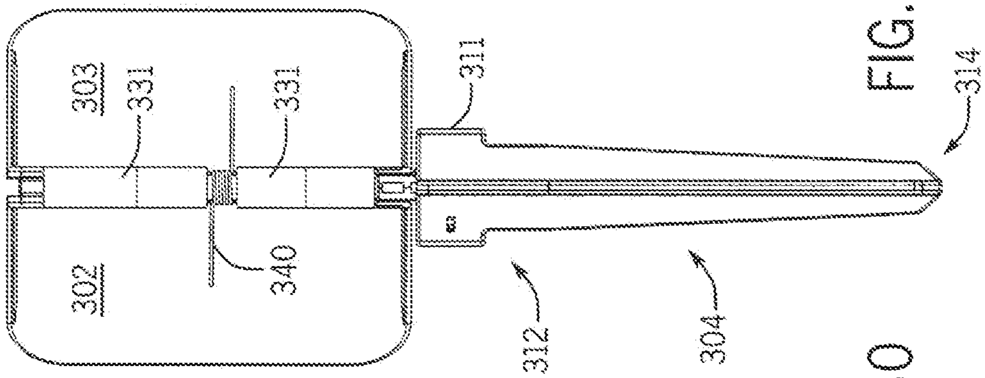
FIG. 31 is an elevation view of the back side of the sprinkler shield.
Figure 30:
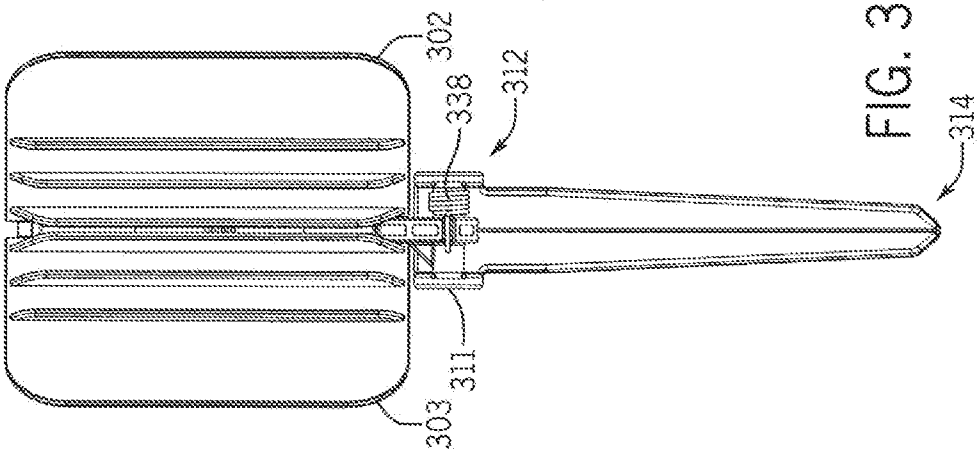
FIG. 30 is an elevation view of the front side the second embodiment of the sprinkler shield of FIG. 29.
Figure 34:
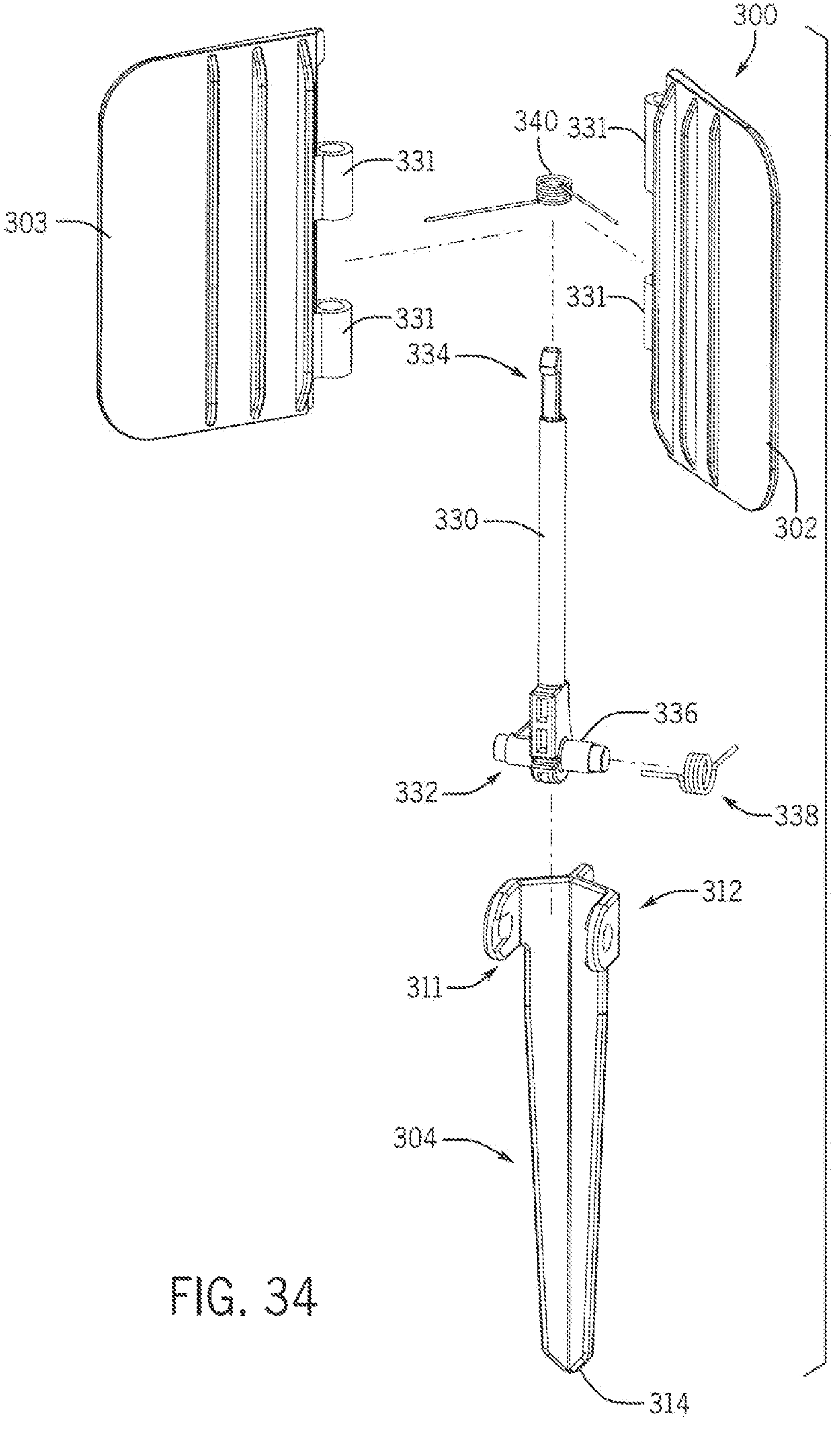
FIG. 34 is an exploded view of the sprinkler shield.
Figure 37:
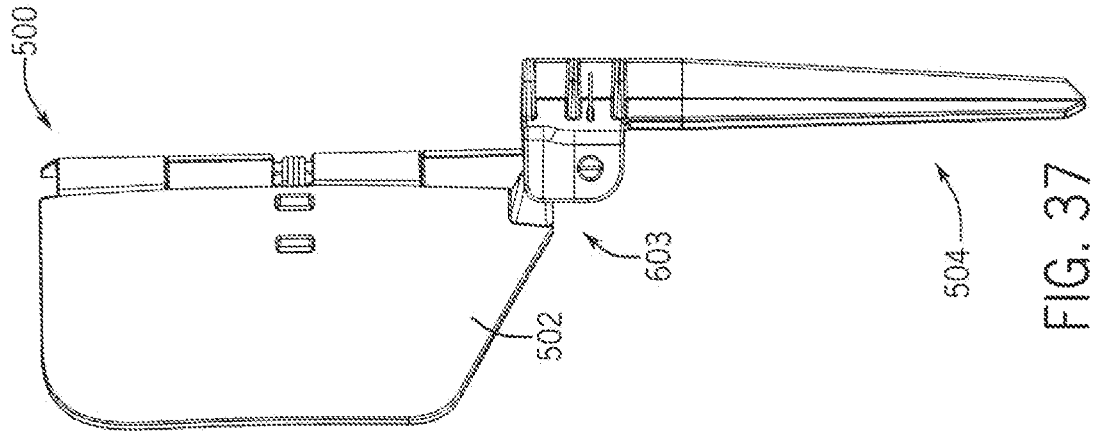
FIG. 37 is a second side elevation view of the sprinkler shield.
Figure 36:
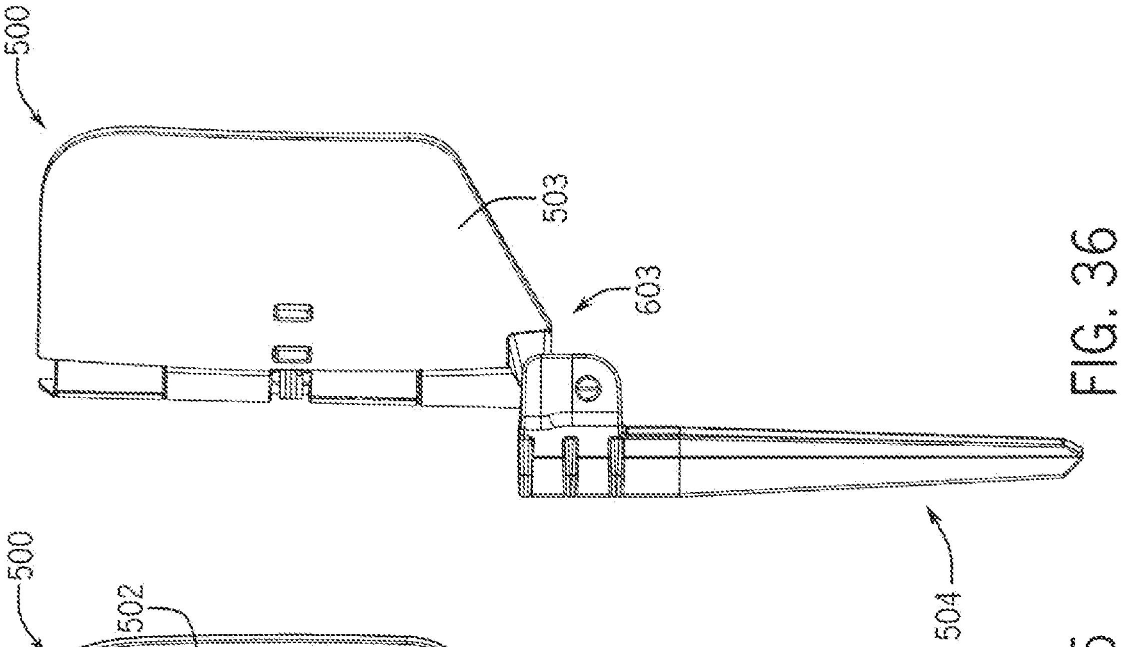
FIG. 36 is a first side elevation view of the sprinkler shield.
Figure 35:
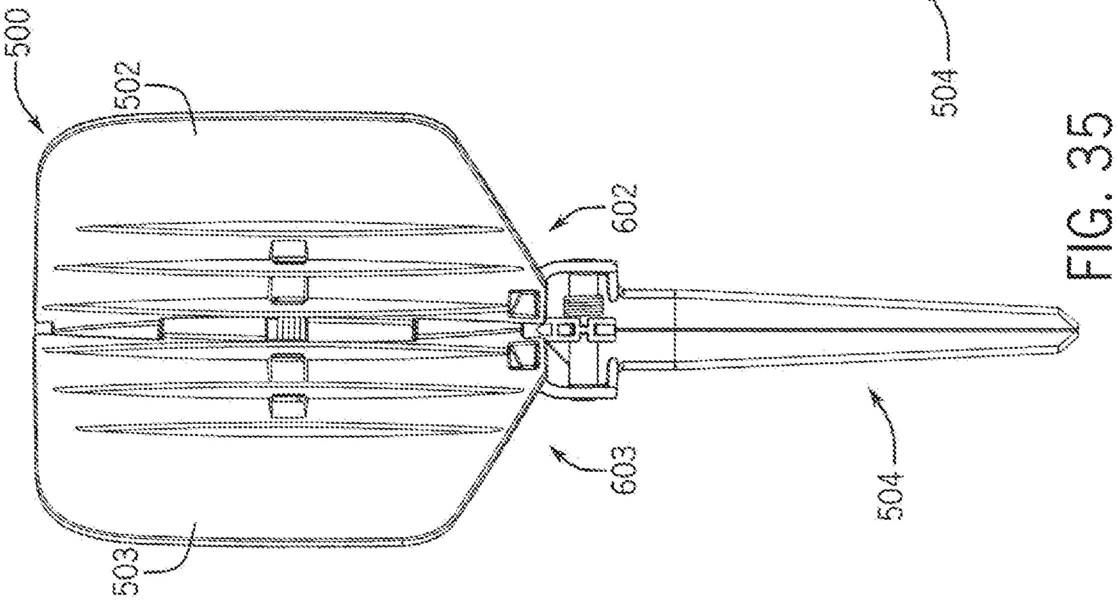
FIG. 35 is a front elevation view of a third embodiment of sprinkler shield for corner applications, which is similar to the sprinkler shield of FIGS. 6-8 and 35-39, wherein the sprinkler shield is in an actuated state whereby it will extend upwardly and outwardly when its associated in ground sprinkler head deploys upwardly.
Figure 38:
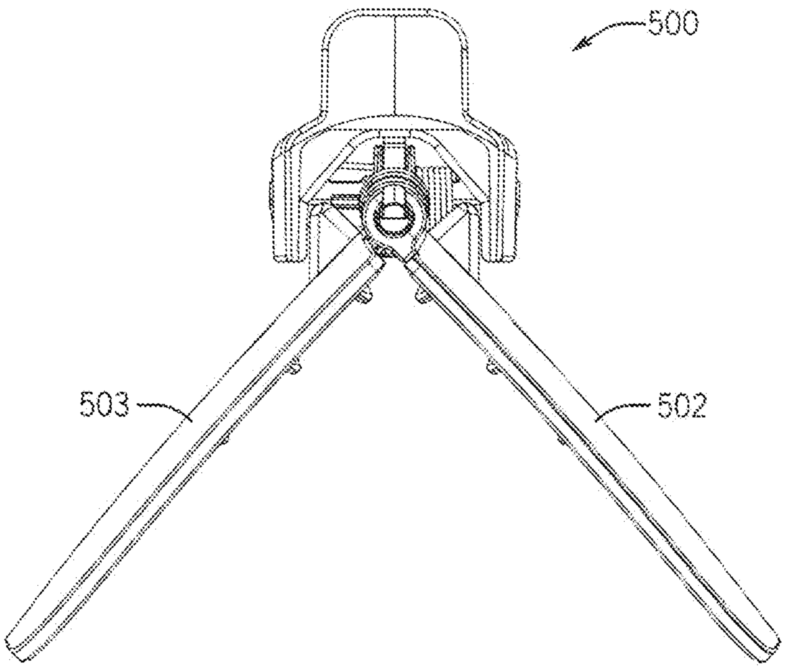
FIG. 38 is a top view of the sprinkler shield.
Figure 39:
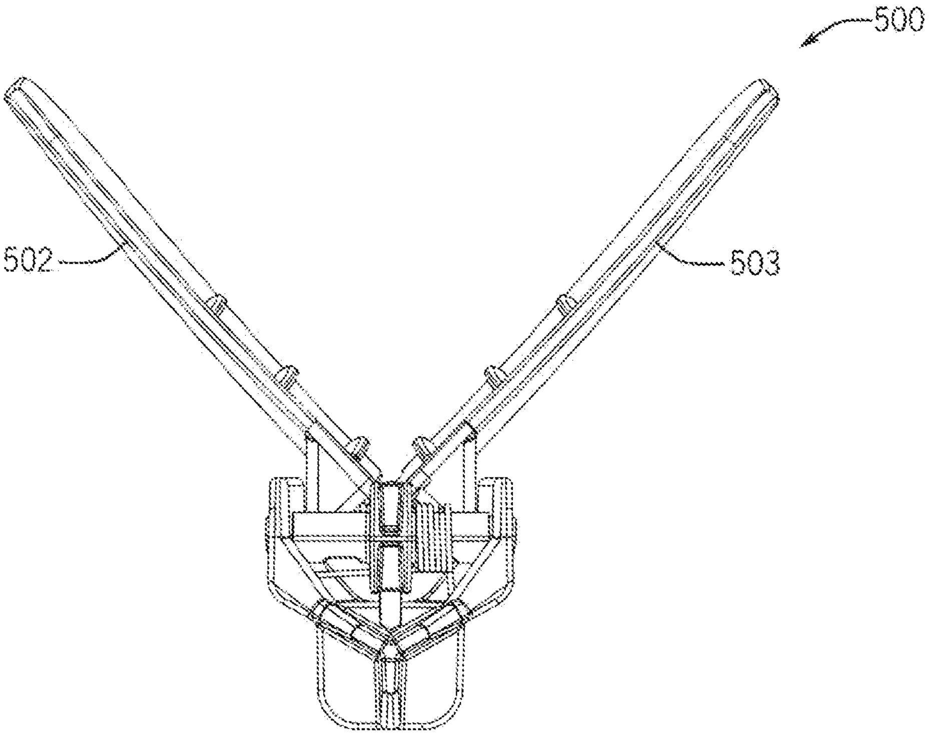
FIG. 39 is a bottom view of the sprinkler shield.
Figure 40:
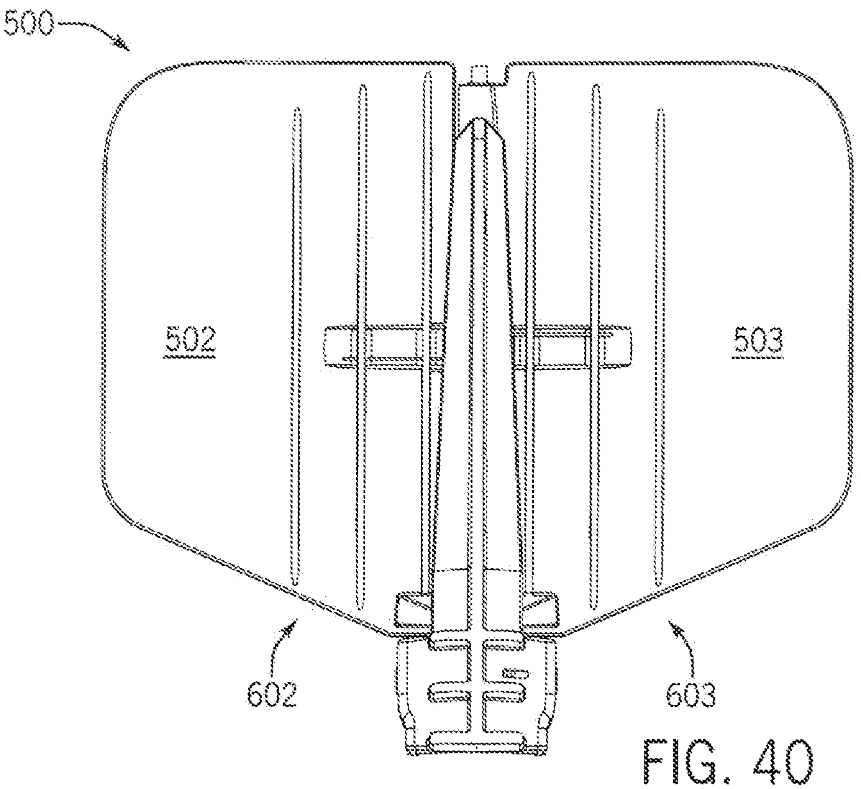
FIG. 40 is another front elevation view of the third embodiment of the sprinkler shield for corner applications of FIGS. 35-39, wherein the sprinkler shield is in an unactuated state whereby it will lay flat when disposed in place in ground proximate a sprinkler head, but is further in a folded state.
Figure 41:
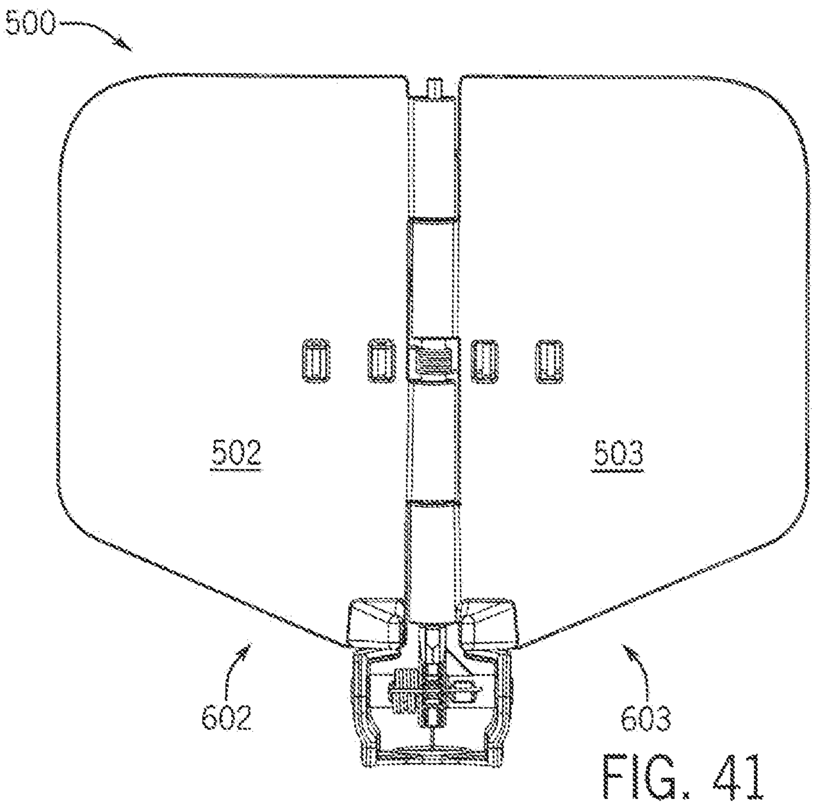
FIG. 41 is a back elevation view of the sprinkler shield of FIG. 40.
Figure 44:
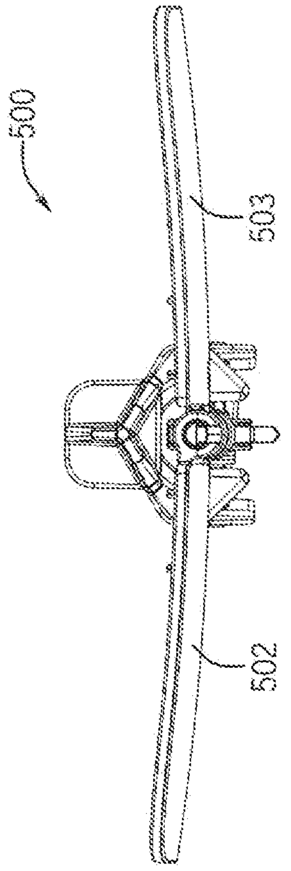
FIG. 44 is a top view of the sprinkler shield.
Figure 45:
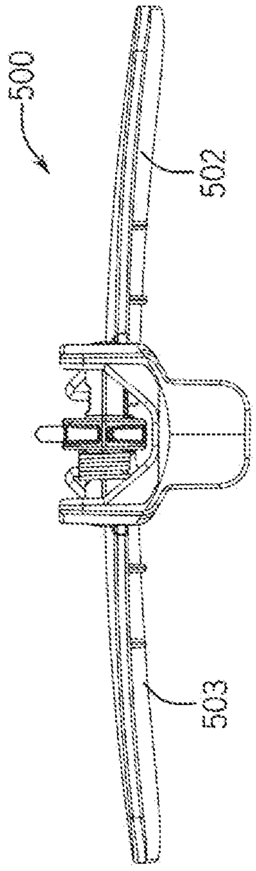
FIG. 45 is a bottom view of the sprinkler shield.
Figure 43:
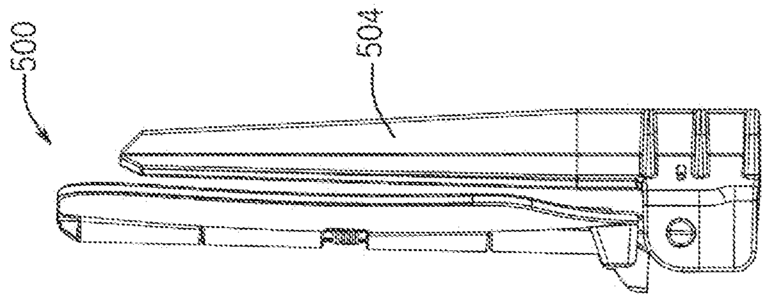
FIG. 43 is a second side elevation view of the sprinkler shield.
Figure 42:
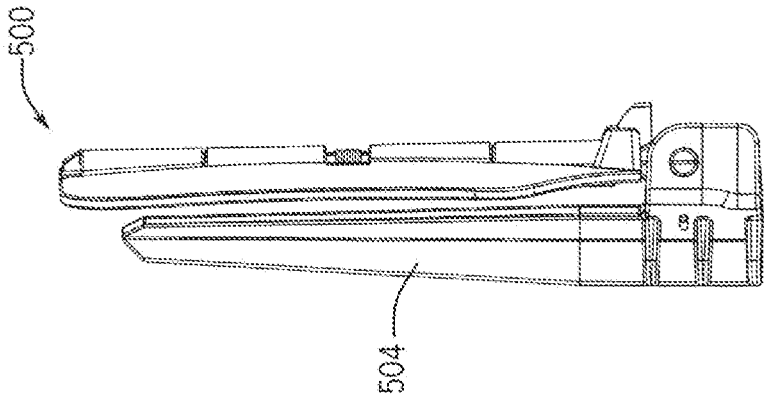
FIG. 42 is a first side elevation view of the sprinkler shield.

Referring also to FIGS. 10-12, in many embodiments, tool 100 further can comprise a rod 104. Rod 104 can comprise a first end 112 and a second end 114. In some embodiments, rod 104 can be coupled to deflector 102 at first end 112. In some embodiments, second end 108 can comprise a stake, which can be inserted into the ground. In the same or other embodiments, second end 114 can comprise a clasp (not shown), which can be attached or coupled to the sprinkler 132. In many embodiments, tool 100 also can comprise a spring 110 which can be configured to pivot deflector 102 about or around pin 106 from a first position to a second position when compressed. In some embodiments, spring 110 can be compressed when a sprinkler head is activated. In many embodiments, the sprinkler head 132, when activated, can raise and apply a force to deflector 102 to move deflector 102 from the second position comprising deflector 102 at a first angle of approximately 70 to approximately 100 degrees from rod 104 to the first position at a second angle of approximately 170 degrees to approximately 190 degrees from rod 104. When the sprinkler head 132 is deactivated or lowered, spring 110 can decompress and move deflector 102 from the upright first position to the lowered second position. In many embodiments, spring 110 can comprise stainless steel.

FIGS. 13-16 show a preferred embodiment of the deflector 102 for the sprinkler shield 100. FIGS. 17-20 show a preferred embodiment of a stalk 104 of the sprinkler shield 100. FIGS. 21-24 show a preferred embodiment of the pivot pin 106 of the sprinkler shield 100. And FIGS. 25-28 show a preferred embodiment of the spring 110 of the sprinkler shield 100.

Figure 6:
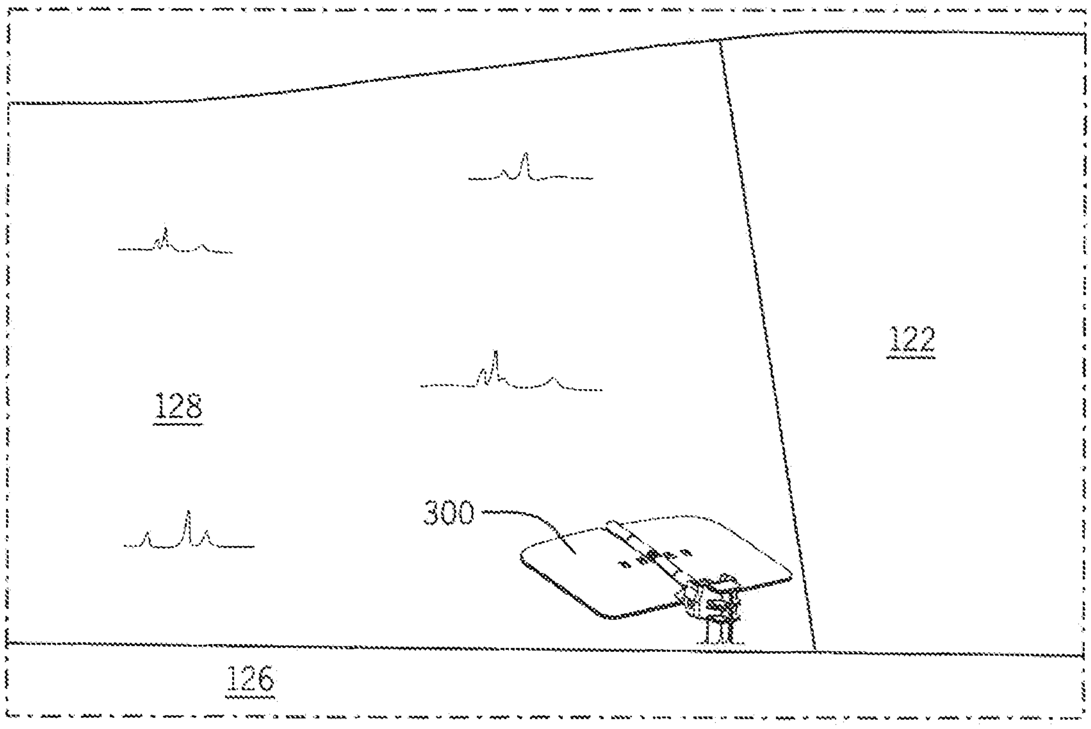
FIG. 6 is a perspective view of a second embodiment of a sprinkler shield of the present invention, which is particularly suitable for use in corner applications (lawn relative to concrete street curb and driveway), wherein the sprinkler shield is fully inserted into ground and in an initial, flat, unactuated state.
Figure 7:
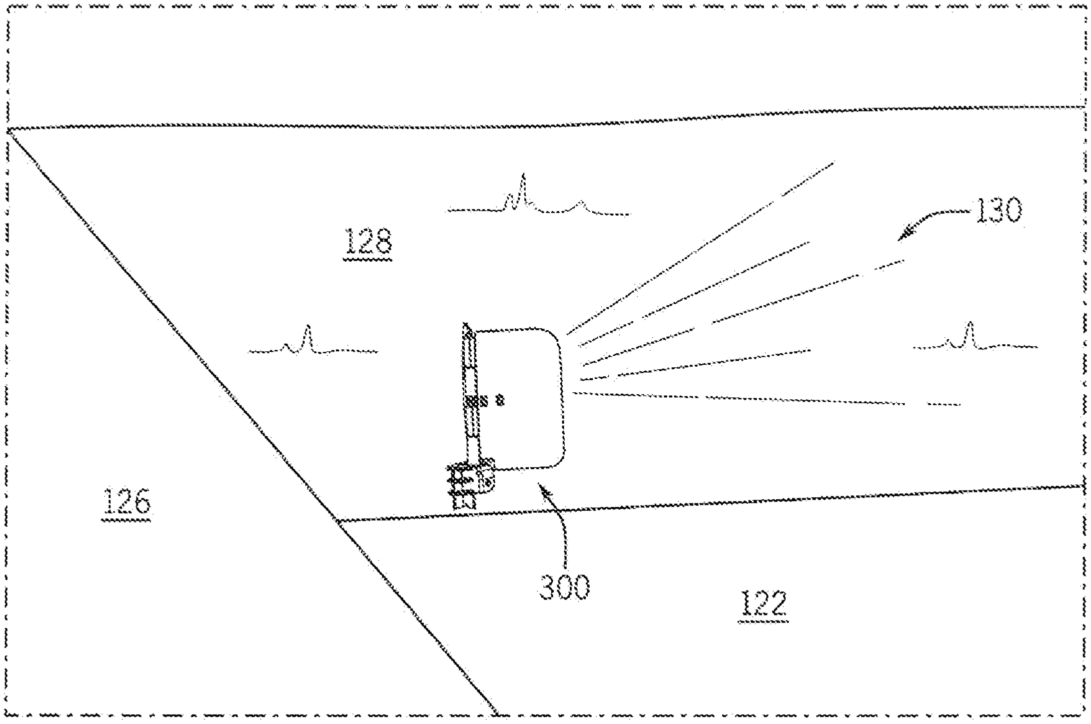
FIG. 7 shows the sprinkler shield in an actuated state, wherein an associated in-ground sprinkler head (hidden from view, except for spray therefrom) has emerged and is spraying water, the water being directed towards the lawn and a nearby area, in this case a street, curb and driveway are shielded from the sprayed water.
Figure 8:
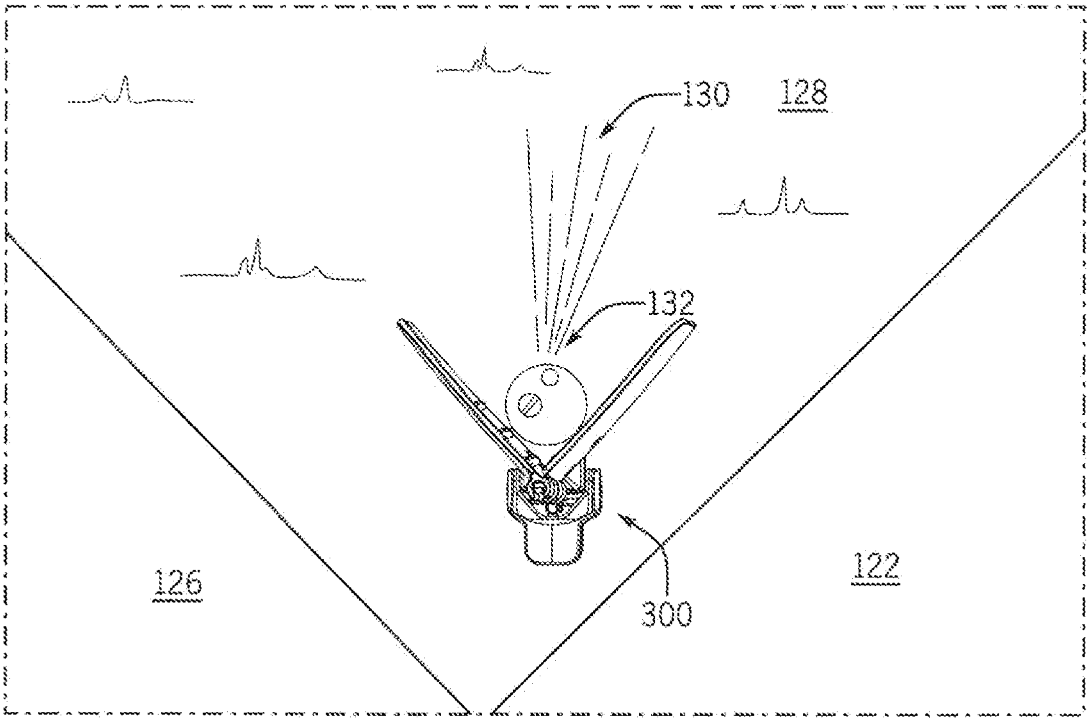
FIG. 8 is a top view of the sprinkler shield and active associated sprinkler head applying water to the lawn, while surrounding impervious areas are shielded from a water spray.
Figure 9:
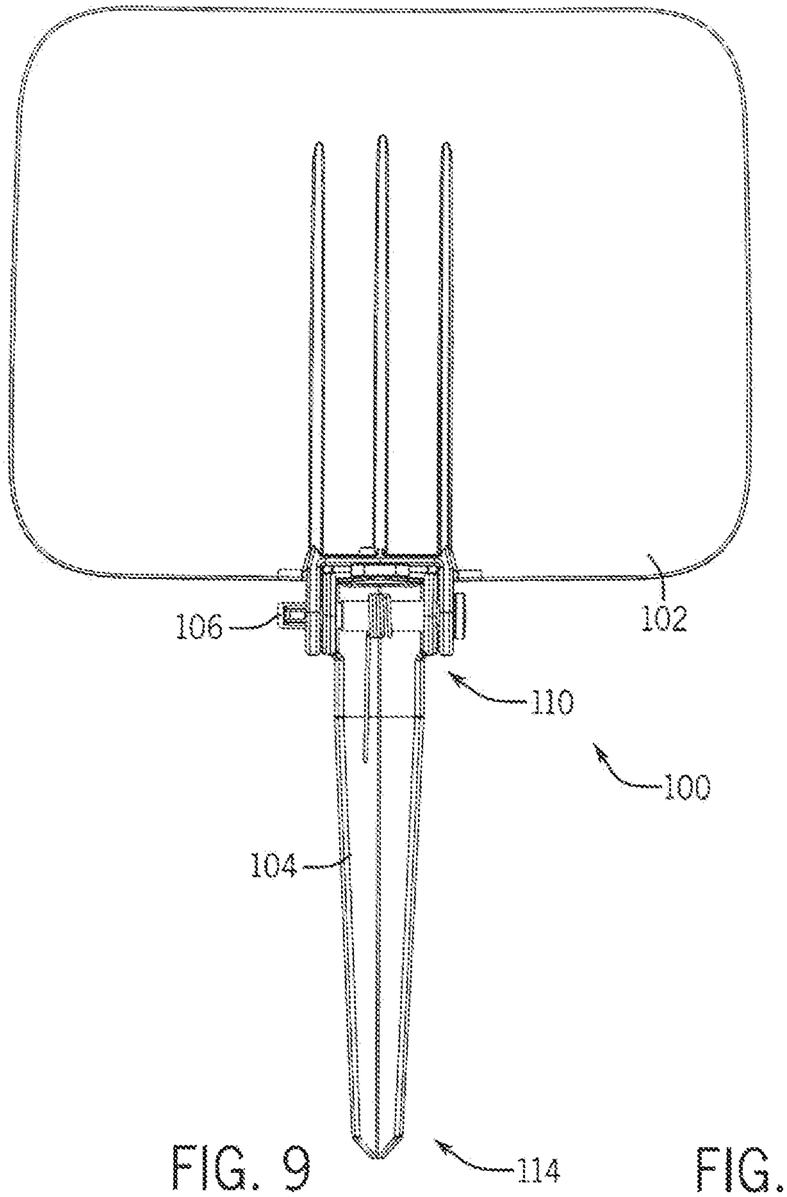
FIG. 9 is a front, elevation view of the first embodiment of the sprinkler shield for straight line applications shown in FIGS. 1-5, wherein the sprinkler shield is in an actuated state whereby it is extend upwardly when its associated in ground sprinkler head deploys upwardly.

FIGS. 6-8 show a second embodiment of the sprinkler shield 300 of the invention is particularly suitable for corner or angled applications where the user wishes to shield an angled portion, for example a 90 degree corner, of sidewalk, driveway 122, street, curb 126, landscaping wall, building or other, feature (horizontal or vertical) that is either impervious to water or for which the user otherwise wishes to shield from spraying. The sprinkler shield 300 blocks or shields those features from contact with water sprayed from an associated sprinkler 132. The sprinkler shield 300 also directs or aids or facilitates in directing water 130 from the associated sprinkler 132 to an angled portion or area (for example an inside corner) of lawn 128, garden, plant(s) or other feature that is desired to be watered Referring also to FIGS. 29-34 an exemplary second embodiment of the sprinkler shield 300 as a tool for shielding sprinkler spray 130 from one area and aiding direction of spray to a desirable area. In some embodiments, tool 300 can be similar to sprinkler shield tool 100 (FIGS. 1-5 and 10-28). In many embodiments, tool 300 can comprise a stalk 304. Stalk 304 can comprise a first stalk end 312, having bracket 311, and a second stalk end 314. In many embodiments, tool 300 also can comprise a male central rod 330 that mates with female brackets 331 on deflectors 302 and 304. In many embodiments, rod 330 can comprise a first rod end 332, a second rod end 334 and a pivot 336 at first rod end 332. In some embodiments, rod 330 can be coupled to second stalk end 312 at first rod end 332. In a number of embodiments, tool 300 can comprise a stalk spring 338. In some embodiments, stalk spring 338 can be similar to spring 110 of the first embodiment of the sprinkler shield 100 shown if FIGS. 25-28. In some embodiments, stalk spring 339 can be inserted on pivot 336.

Figure 2:
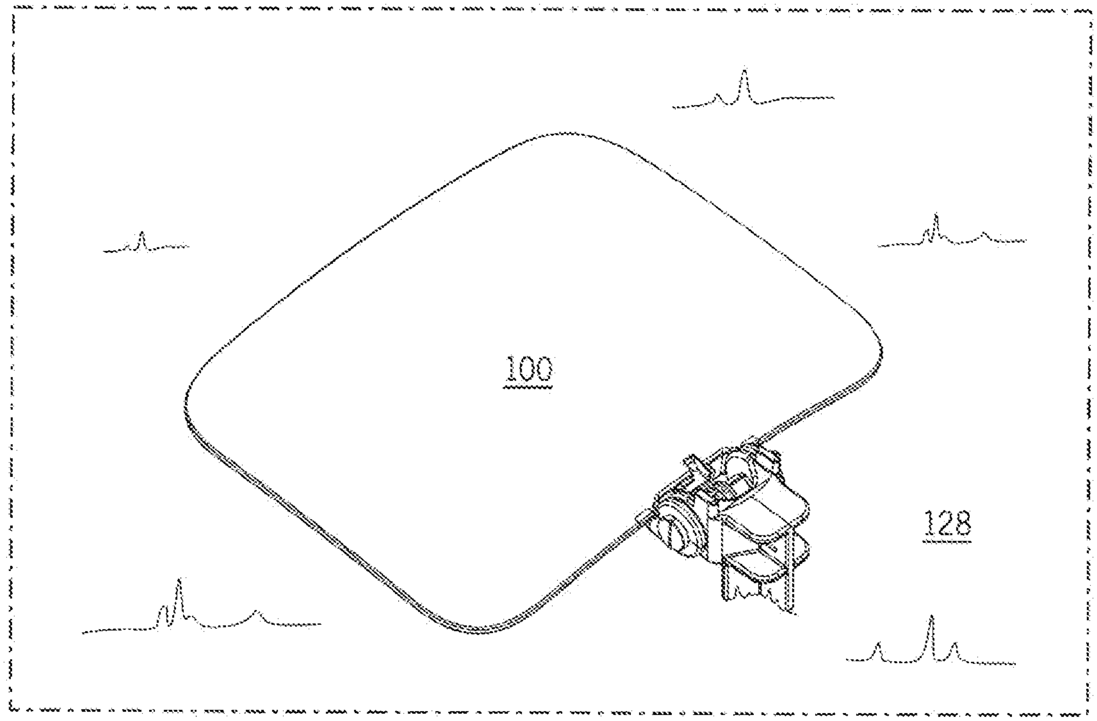
FIG. 2 is a further perspective view of the sprinkler shield, wherein the sprinkler shield is fully deployed in place in a lawn, proximate a dormant sprinkler head (not shown) and wherein the sprinkler shield is not actuated by the sprinkler head.
Figure 3:
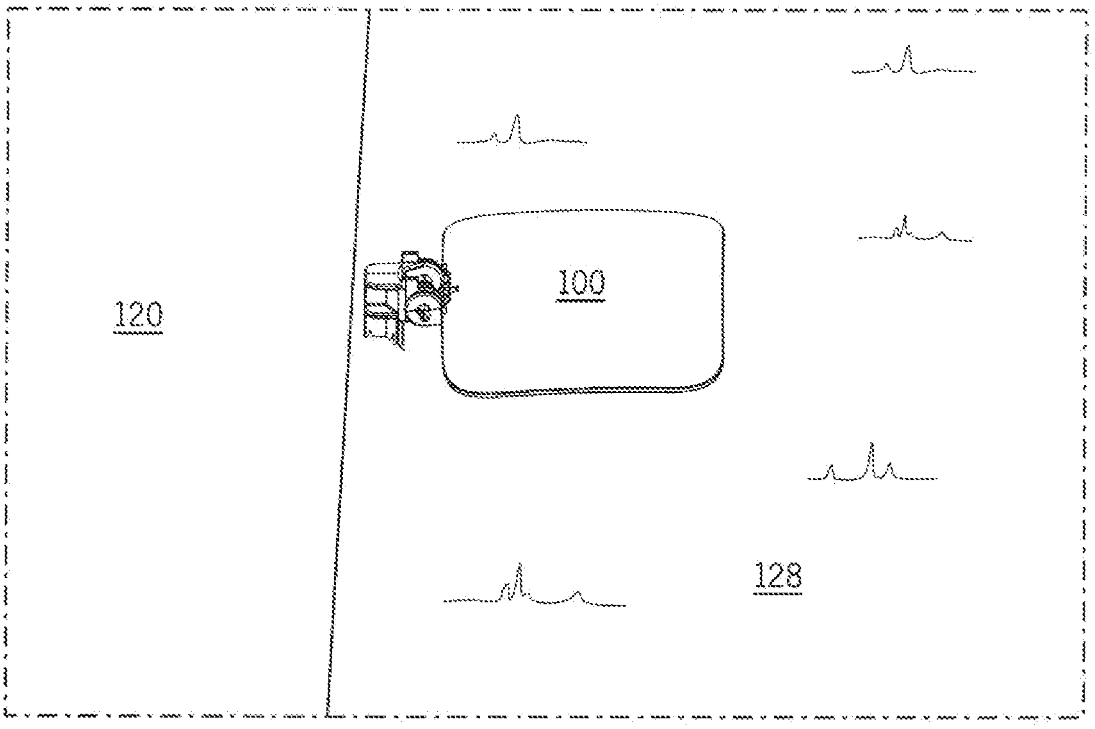
FIG. 3 shows the sprinkler shield positioned in a straight line or substantially straight line application for example near a sidewalk, driveway, or other feature that is impervious to water, or for which watering is otherwise not desired.
Figure 4:
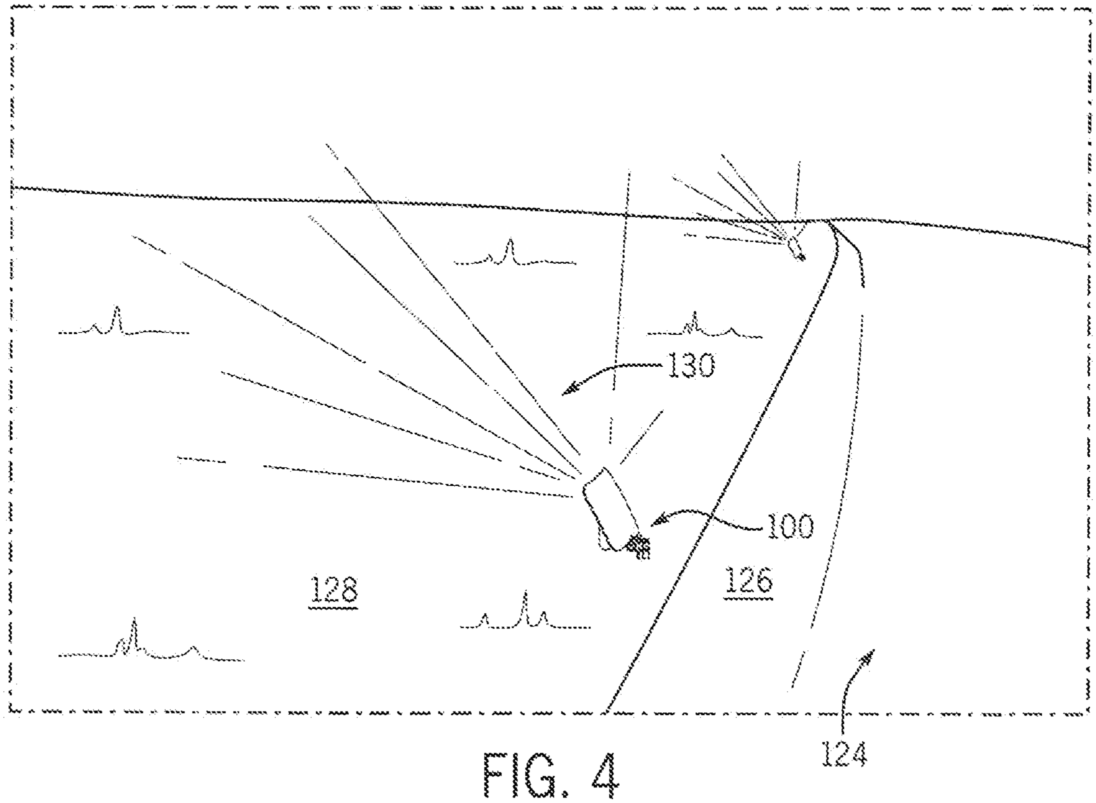
FIG. 4 shows the sprinkler shield in an actuated state, wherein an associated in-ground sprinkler head has emerged and is spraying water, the water being directed towards the lawn and a nearby area, in this case a street and curb are shielded from the sprayed water.
Figure 5:
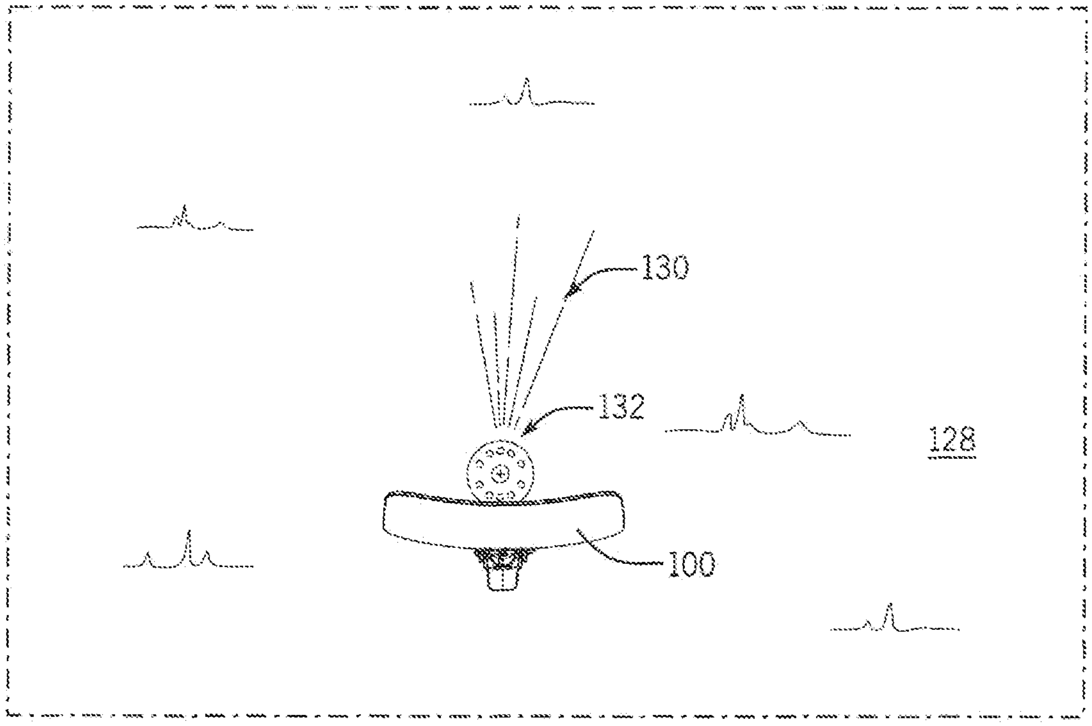
FIG. 5 is a top view of the sprinkler shield and associated sprinkler or sprinkler head applying water.

In many embodiments, tool 300 also can comprise a first deflector 302 coupled to rod 316. In some embodiments, tool 300 also can comprise a second deflector 303 at a first angle from first deflector 302 and coupled at rod 330. In many embodiments, first deflector 302 and second deflector 303 can be similar to deflector 302 (FIGS. 1-2). In many embodiments, tool 300 further can comprise a deflector spring 340 configured to separate first deflector 302 from second deflector 303 at an angle. In many embodiments, the angle can be approximately 70 degrees to approximately 100 degrees.

Turning to the FIGS. 35-45, a third embodiment of the sprinkler shield tool 500 is shown constructed and arranged substantially similar to the tool 300 in FIGS. 6-8 and 29-34 having a ground stalk 504 with pivoting deflectors 502 and 503 but with the bottom two corners 602 and 603 of the deflectors 502 and 530 angled to provide extra clearance when the deflectors 502/503 are folded down.

Although a tool 100, 300 and 500 for directing the spray of water from a sprinkler 132 has been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element may be modified, and that the foregoing discussion of certain of these embodiments does not necessarily represent a complete description of all possible embodiments. For example, one or more of the activities of the drawings may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Although the apparatus has been described in connection with the field of sprinkling water for residential landscaping purposes, it can readily be appreciated that it is not limited solely to such field, and can be used in other fields including, but not limited to agricultural, industrial, commercial applications of liquids, including chemicals, compositions, mixtures and the like.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order.

It is to be understood that the terms so used are interchangeable under appropriate circumstances such that the embodiments described herein are, for example, capable of operation in sequences other than those illustrated or otherwise described herein. Furthermore, the terms “include,” and “have,” and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms “left,” “right,” “front,” “back,” “top,” “bottom,” “over,” “under,” and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

Although the invention or elements thereof may by described in terms of vertical, horizontal, transverse (lateral), longitudinal, and the like, it should be understood that variations from the absolute vertical, horizontal, transverse, and longitudinal are also deemed to be within the scope of the invention.

The terms “couple,” “coupled,” “couples,” “coupling,” and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. “Electrical coupling” and the like should be broadly understood and include electrical coupling of all types. The absence of the word “removably,” “removable,” and the like near the word “coupled,” and the like does not mean that the coupling, etc. in question is or is not removable.

As defined herein, “approximately” can, in some embodiments, mean within plus or minus ten percent of the stated value. In other embodiments, “approximately” can mean within plus or minus five percent of the stated value. In further embodiments, “approximately” can mean within plus or minus three percent of the stated value. In yet other embodiments, “approximately” can mean within plus or minus one percent of the stated value.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A sprinkler shield for placement proximate to a separate and independent sprinkler head to direct spray from the sprinkler head towards a desired area such as a lawn and away from an undesired area such as a sidewalk, driveway or the like, comprising:

at least one deflector for directing spray from the sprinkler head towards the desired area and away from the undesired area;

a stalk comprising a first end and a second end, wherein the stalk is coupled to the at least one deflector at the first end, the stalk being adapted to be placed in ground proximate the sprinkler head; and a spring configured to pivot the deflector, by contact of the sprinkler head with the deflector, from a first substantially horizontal position over the sprinkler head to a second substantially vertical position adjacent to the sprinkler head when compressed by action of the sprinkler head coming into contact with the sprinkler head.

2. The sprinkler shield of claim 1, wherein the sprinkler shield is placed, in use, proximate an in-ground, pop-up sprinkler head.

3. The sprinkler shield of claim 2, wherein, in use:

the first end of the stalk is disposed in earth proximate the sprinkler head and the stalk extends vertically therefrom;

in the first substantially horizontal position, the at least one deflector is held by the spring at an angle of approximately 90 degrees relative to the substantially vertically oriented stalk;

whereby actuation of the separate in-ground sprinkler head causes the spring to compress, and the at least one deflector to move upwardly against the compressed spring, from the first position to the second substantially vertical position wherein the at least one deflector is disposed in an upright orientation; and whereby deactivation of the sprinkler head enables the spring to return the at least one deflector to the first position.

4. The sprinkler shield of claim 3, wherein, in the upright orientation, the deflector is angled about a horizontal plane between 170 and 190 degrees relative to the substantially vertical stalk.

5. The sprinkler shield of claim 3, wherein the at least one deflector has a bracket, the first end of the stalk has a bracket, and a pin connects the deflector bracket to the stalk bracket, the spring being disposed around the pin and engaging the stalk and the at least one deflector.

6. The sprinkler shield of claim 3, wherein there are two planar deflectors; a first deflector being angled about a vertical plane relative to a second deflector.

7. The sprinkler shield of claim 6, further comprising a deflector spring pivot assembly that causes the first deflector to be disposed at an angle relative to the second deflector upon actuation by a sprinkler head.

8. The sprinkler shield of claim 7, wherein the deflector spring pivot assembly comprises a deflector spring, a vertical rod, and brackets disposed on the two deflectors, the vertical rod being disposed in deflector brackets, and the deflector spring being disposed around the vertical rod.

9. The sprinkler shield of claim 7, wherein actuation of the sprinkler shield by a sprinkler head causes the two substantially vertically disposed deflectors to assume the angled orientation with respect to each other.

10. The sprinkler shield of claim 7, wherein the two deflectors are angled about the vertical plane between 70 and 100 degrees of each other.

11. The sprinkler shield of claim 1, wherein the at least one deflector is constructed of polypropylene.

12. The sprinkler shield of claim 1, wherein the spring is constructed of stainless steel.

13. A sprinkler shield for placement proximate to a separate and independent sprinkler head to direct spray from the sprinkler head towards a desired area such as a lawn and away from an undesired area such as a sidewalk, driveway or the like comprising:

a stalk comprising a first stalk end and a second stalk end, the stalk being adapted to be placed in ground proximate the sprinkler head;

a rod coupled to the stalk at the second stalk end, where the rod comprises a first rod end, a second rod end, and a pivot at the first rod end;

a stalk spring inserted on the pivot;

a first deflector coupled to rod;

a second deflector at a first angle from the first deflector and coupled to the rod; and a deflector spring configured to separate the first deflector from the second deflector at an angle about a vertical plane;

whereby the stalk spring is configured to pivot the first and second deflectors, by contact of the sprinkler head with the deflectors, from a first substantially horizontal position over the sprinkler head to a second substantially vertical position adjacent to the sprinkler head when compressed by action of the sprinkler head coming into contact with the sprinkler head.

* * * * *